J. STEPHENSON.

STREET-CAR GRAB-HANDLE.

No. 6,918. Reissued Feb. 8, 1876.

Witnesses:

D. G. Stuart

L. H. Bart.

Inventor:

John Stephenson by S. Hanway Atty.

N. PETERS, PHOTO-LITHOGRAPHER, WASHINGTON, D. C.

UNITED STATES PATENT OFFICE.

JOHN STEPHENSON, OF NEW YORK, N. Y.

IMPROVEMENT IN STREET-CAR GRAB-HANDLES.

Specification forming part of Letters Patent No. 87,120, dated February 23, 1869; reissue No. 6,918, dated February 8, 1876; application filed August 20, 1875.

DIVISION H².

*To all whom it may concern:*

Be it known that I, JOHN STEPHENSON, of New York, in the county of New York, and State of New York, have invented certain new and useful Improvements in Fastening Street-Car Handles; and I do hereby declare that the following is a full, clear, and exact description thereof, that will enable others skilled in the art to which it appertains to make and use the same, reference being had to the accompanying drawings, and to the letters of reference marked thereon, which form a part of this specification, in which—

Figure 1:
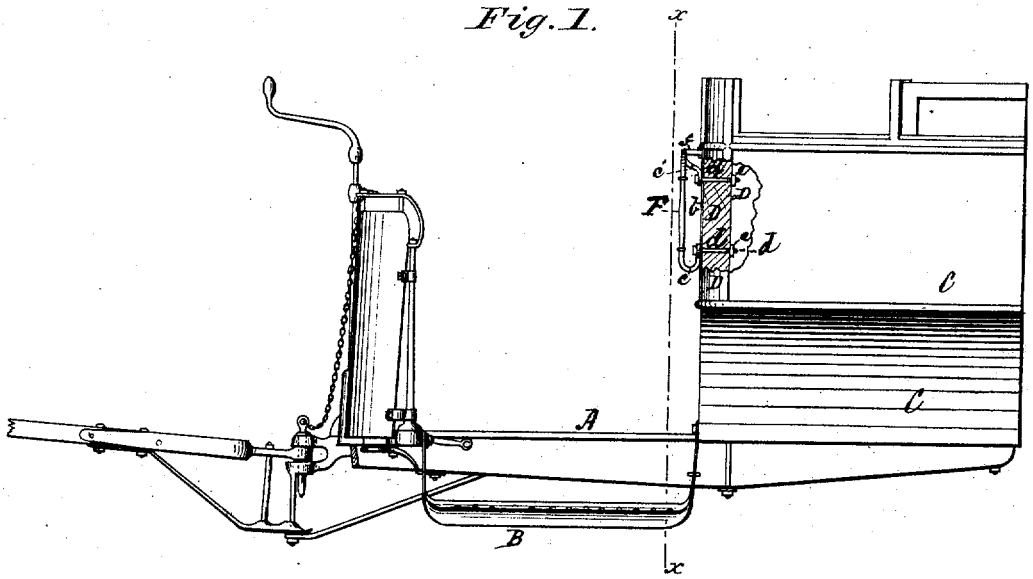
Figure 2:
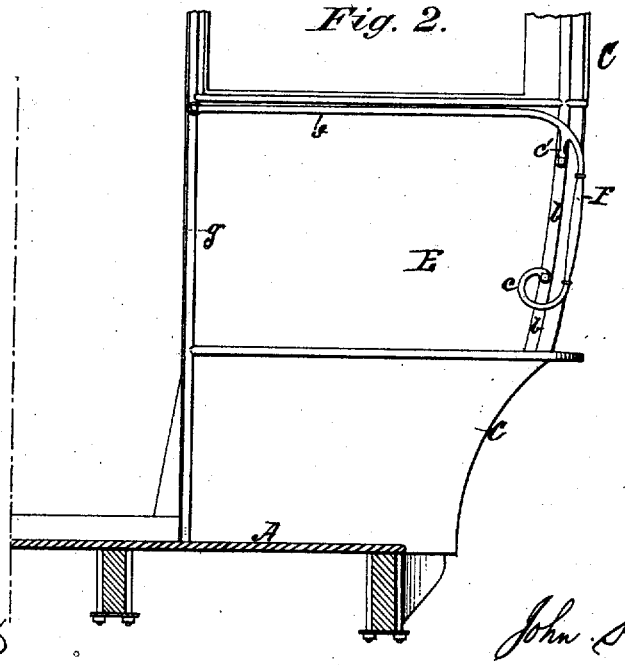

Figure 1 represents a side elevation of the lower portion of the front end of a street-car body, to which my improvement has been applied, there being a portion of the outer wall of the car-body broken out, in order to give a better illustration of the improvement. Fig. 2 represents a vertical section through the line *x x* of Fig. 1, looking toward the body of the car.

This division of my invention relates to a new and improved mode of attaching the grab-handles, which are intended to be taken hold of by the passengers, to steady themselves in entering or leaving the car. These handles are arranged at the entrance to the steps of the car, in an exposed place, that the passengers may readily seize hold of them. It is all-important they should be strong and well secured, that they may not be jerked from their fastenings, either by the passengers or contact with vehicles.

Heretofore the method of fastening these handles has been simply to pass an ordinary screw through each of their outer limbs or feet, and into the panels and corner pillars.

Practice has shown that the fastening-screws become loosened or broken off, thereby allowing water to enter around the screws, which causes the panels and corner pillars to decay. Under such circumstances they become unable longer to hold the screws, so that the handles fail to support the passengers when seized or grasped by them in making their entrance to and exit from the cars. My improved construction provides a complete remedy for the evil.

My improvement consists in combining the grab-handle with the car-body through the instrumentality of an interposed panel-plate, and then securing the whole together by passing screw-bolts of suitable size through the grab-handle, panel-plate, panel, and corner pillar of the car, and then firmly uniting them together by means of a screw-nut on the inner end of each of the bolts. The interposition of the panel-plate between the grab-handle and the outer panel of the car gives a firm support to the grab-handle, and effectually prevents the entrance of water around the bolts, and the consequent rotting of the panel and pillar of the car, while the screw bolts and nuts provide a sure and safe support in the grab-handle to the passengers on entering and leaving the car.

To enable others skilled in the art to make, construct, and use my improvement, I will now proceed to describe the parts in detail.

The body of the car may be of the ordinary construction. In the drawing, A indicates the platform; B, the step; C, the car-body; D, one of the corner pillars of the car, exposed by breaking out a portion of the outside wall or side main panel, and then cutting out a piece of the pillar to show the passage of the screw-bolts that secure the grab-handle. E represents one of the front panels, to the outer side of which, near its edge, is secured a metallic panel-plate, *b*, by means of screws. F indicates one of the grab-handles, each of which are provided with two feet, *c c'*, of suitable size and shape, so constructed as to fit the panel-plate, the one above the other. Each of these feet is provided with a hole, which coincides with corresponding holes formed in the panel-plate. Through these holes in the feet and panel-plate *b*, and corresponding holes bored in the panel and corner pillar D, is passed a screw-bolt, *d*, on the inner end of which is then placed a screw-nut, *e*, by means of which the whole are firmly and permanently united together. The metallic panel-plate consists of a strip of hoop-metal, and is put in place and secured by screws after the body and panel are in place. These screws are made to pass through the panel-plate and panel into the corner pillar, and serve to keep the panel firmly in place, and to exclude water, as the screw-bolts *d* are made to fit snugly in the holes cut in it.

By reference to Fig. 2 it will be seen that the upper end of the grab-handle F is provided with an arm, *f*, which extends inwardly as far as the door-jamb *g*, where, making a bend, it is provided with a foot, by which it is attached by means of a screw or screw-bolt to the jamb. This arm serves as a rail for the passengers, and as a stay to the grab-handle, which it helps to strengthen.

Having described my invention, what I claim as new, and desire to secure by Letters Patent, is—

1. In combination with a street-car body, a grab-handle and panel-plate, secured in position by screw-bolts and nuts, the screw-bolts passing through the grab-handle, panel-plate, panel, and corner pillar, substantially as set forth.

2. A grab-handle for street-cars, provided with an arm or rail, *f*, for the purposes set forth.

In testimony that I claim the foregoing I have hereunto set my hand this 21st day of July, 1875.

JOHN STEPHENSON.

Witnesses:
AUGUST RIPPERGER,
JOHN SMITH.